US009805091B2

(12) United States Patent
Cui et al.

(10) Patent No.: US 9,805,091 B2
(45) Date of Patent: Oct. 31, 2017

(54) PROCESSING A DATABASE TABLE

(71) Applicant: International Business Machines Corporation, Armonk, NY (US)

(72) Inventors: Kai Feng Cui, Beijing (CN); Shuo Li, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 14/489,374

(22) Filed: Sep. 17, 2014

(65) Prior Publication Data
US 2015/0127666 A1 May 7, 2015

(30) Foreign Application Priority Data

Nov. 1, 2013 (CN) .......................... 2013 1 0535061

(51) Int. Cl.
*G06F 17/30* (2006.01)
*G06F 7/36* (2006.01)

(52) U.S. Cl.
CPC .......... *G06F 17/30448* (2013.01); *G06F 7/36* (2013.01); *G06F 17/30286* (2013.01); *G06F 17/30595* (2013.01); *G06F 17/30961* (2013.01)

(58) Field of Classification Search
CPC ................ G06F 7/24; G06F 17/30595; G06F 17/30286; G06F 7/22; G06F 17/30448; G06F 7/36
USPC ......................................................... 707/752
See application file for complete search history.

(56) References Cited

U.S. PATENT DOCUMENTS

| 5,974,408 A | 10/1999 | Cohen |
| 6,185,557 B1 * | 2/2001 | Liu ................... G06F 17/30498 |
| 6,438,562 B1 * | 8/2002 | Gupta ............... G06F 17/30336 |
| | | 707/696 |
| 7,099,864 B2 | 8/2006 | Finlay |

(Continued)

FOREIGN PATENT DOCUMENTS

| CN | 101751406 A | 6/2010 |
| CN | 102651008 A | 8/2012 |

OTHER PUBLICATIONS

Wang, et al., "Avoiding sorting and grouping in processing queries," :http://citeseerx.ist.psu.edu/viewdoc/download?doi=10.1.1.7.6123 &rep=rep1&type=pdf.

(Continued)

*Primary Examiner* — Shahid Alam
*Assistant Examiner* — Andalib Lodhi
(74) *Attorney, Agent, or Firm* — Anthony V. S. England; Erik K. Johnson

(57) ABSTRACT

Processing a database table comprises receiving a multi-dimensional processing instruction for processing at least two columns of the database table, wherein the two columns comprise a selection column and a sort column, wherein the multi-dimensional processing instruction is for selecting a plurality of candidate rows by sorting based on the selection column and the sort column. An index takes the selection column as master column and the sort column as slave column. Nodes in the index are selected according to the selection column. Each of the selected nodes is associated with a respective slave column value sequence. A merge sort is performed on each of the slave column value sequences to obtain a sort result for the candidate rows.

12 Claims, 7 Drawing Sheets

(56) References Cited

U.S. PATENT DOCUMENTS

| | | | |
|---|---|---|---|
| 7,765,211 B2* | 7/2010 | Bhattacharjee | G06F 17/30592 |
| | | | 707/737 |
| 8,356,060 B2* | 1/2013 | Marwah | H03M 7/30 |
| | | | 382/243 |
| 8,478,775 B2 | 7/2013 | Netz | |
| 2009/0063458 A1 | 3/2009 | Beavin | |
| 2009/0138428 A1* | 5/2009 | Thomsen | G06F 17/30536 |
| 2012/0221577 A1 | 8/2012 | Fuh | |

OTHER PUBLICATIONS

Zirkel, et al., "Exploitation of pre-sortedness for sorting in query processing: the temptris-algorithm for UB-trees," http://ieeexplore.ieee.org/xpl/login.jsp?tp=&arnumber=938082&url=http%3A%2F%2Fieeexplore.ieee.org%2Fxpls%2Fabs_all.jsp%3Farnumber%3D938082.

* cited by examiner

| Row No. | C1 | C2 |
|---|---|---|
| 1 | 1 | 43 |
| 2 | 2 | 83 |
| 3 | 3 | 34 |
| 4 | 4 | 72 |
| 5 | 5 | 34 |
| 6 | 6 | 76 |
| 7 | 7 | 55 |
| 8 | 8 | 33 |
| 9 | 9 | 23 |
| 10 | 10 | 34 |
| 11 | 1 | 76 |
| 12 | 2 | 82 |
| 13 | 3 | 56 |
| 14 | 4 | 86 |
| 15 | 5 | 23 |
| 16 | 6 | 45 |
| 17 | 7 | 65 |
| 18 | 8 | 23 |
| 19 | 9 | 54 |
| 20 | 10 | 22 |

*FIG. 2*

PROCESSING A DATABASE TABLE

BACKGROUND

The present invention relates to computer technology and more specifically to processing a database table.

Database software often needs to perform multi-dimensional processing on a database table. For example, consider the following SQL statements:

---
code 1

SELECT C2
FROM T1
WHERE C1 IN (1, 5, 7, 9)
ORDER BY C2
FETCH FIRST 4 ROWS ONLY

---

Wherein, T1 is name of a table which includes at least two columns, i.e. C1 and C2. The above statements are for processing acquired data of T1 in two dimensions, that is, C1 and C2. Specifically, the above statements select those rows in which values of C1 are 1, 5, 7 or 9 from T1, sort these rows based on values of C2 in these rows and, finally, fetch the first 4 rows. It can be seen that the above statements not only cause processing on column C1, but also on column C2. In this manner, the SQL statements provide two-dimensional processing.

Assume T1 is as shown in FIG. 2, wherein grey part represents actual content of T1. The above statements select the $1^{st}$, $5^{th}$, $7^{th}$, $9^{th}$, $11^{th}$, $15^{th}$, $17^{th}$, $19^{th}$ rows from T1. Values of C2 in these rows are 43, 34, 55, 23, 76, 23, 65, 54 respectively, which are sorted in descending order as 76, 65, 55, 54, 43, 34, 23, 23. Thus the finally fetched rows are the $11^{th}$, $17^{th}$, $9^{th}$, $19^{th}$ rows.

SUMMARY

Embodiments of the invention provide a method and apparatus of processing a database table.

A method of processing a database table according to an embodiment of the invention comprises: receiving a multi-dimensional processing instruction for processing at least two columns of the database table, wherein the two columns comprise a selection column and a sort column. The multi-dimensional processing instruction is for selecting candidate rows of the table by sorting based on the selection column and the sort column. The method includes selecting, based on an index that takes the selection column as master column and the sort column as slave column, nodes in the index according to the selection column, wherein each of the selected nodes is associated with a respective slave column value sequence. The method includes performing merge sort on each of the slave column value sequences to obtain a sort result for the candidate rows.

A system of processing a database table according to an embodiment of the invention comprises: a processor and computer readable storage media having instructions stored thereon for execution by the processor, wherein the instructions executed by the processor cause the processor to perform operations comprising receiving a multi-dimensional processing instruction for processing at least two columns of the database table, wherein the two columns comprise a selection column and a sort column. The multi-dimensional processing instruction is for selecting candidate rows by sorting based on the selection column and sort column. The system includes selecting based on an index that takes the selection column as master column and the sort column as slave column, nodes in the index according to the selection column, wherein each of the selected nodes is associated with a respective slave column value sequence. The system includes perform merge sort on each of the slave column value sequences to obtain a sort result for the candidate rows.

A computer program product for processing a database table according to an embodiment of the invention the computer program product comprises: a non-transitory computer readable storage medium having program instructions embodied therewith, the program instructions executable by a computer to cause the computer to perform operations comprising: receiving a multi-dimensional processing instruction for processing at least two columns of the database table, wherein the two columns comprise a selection column and a sort column. The multi-dimensional processing instruction is for selecting candidate rows of the table by sorting based on the selection column and the sort column. The program instructions are executable by the computer to cause the computer to select, based on an index that takes the selection column as master column and the sort column as slave column, nodes in the index according to the selection column, wherein each of the selected nodes is associated with a respective slave column value sequence. The program instructions are executable by the computer to cause the computer to perform merge sort on each of the slave column value sequences to obtain a sort result for the candidate rows.

BRIEF DESCRIPTION OF THE SEVERAL VIEWS OF THE DRAWINGS

Through the more detailed description herein below of some embodiments of the present disclosure in the accompanying drawings, the above and other objects, features and advantages of the present disclosure will become more apparent, wherein the same reference number generally refers to the same components in embodiments of the present disclosure of the following figures:

FIG. 2 is an illustrative database table;

DETAILED DESCRIPTION

Figure 1:
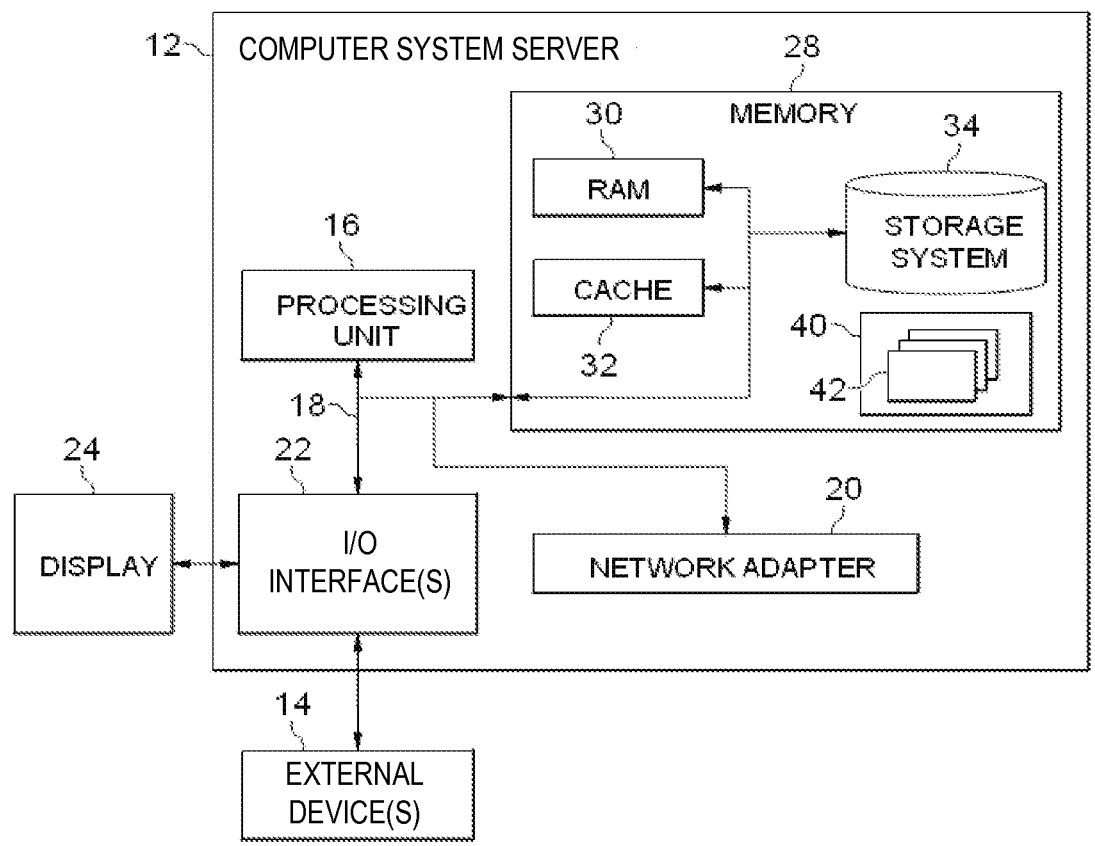
FIG. 1 depicts a block diagram of an exemplary computer system/server 12 applicable to implement embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include industry standard Architecture (ISA) bus, Micro channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Row and column are basic concepts concerning a database table. In the present application, vertical direction is taken as column and horizontal direction is taken as row for description and illustration. However, those skilled in the art can appreciate that, vertical direction may also be taken as row and horizontal direction may also be taken as column. Thus, "row" and "column" in this application just represent two directions in a database table that are interchangeably related to one another, where different units in a same row represent values of different attributes of a same object, and different units in a same column represent values of a same attribute of different objects, or vice versa. For example, in a database table for recording student information, information such as name, age and student ID of a student will be recorded. Name, age and student ID of a same student form a row; and names of different students form a column.

A first of two columns may be used for selecting a plurality of candidate rows that need to be sorted. This first column may be referred to as a selection column. The other of the two columns may be used for sorting the candidate rows, and this other column may be referred to as a sort column. Taking SQL statements given in code 1 for example, these statements may be for a multi-dimensional processing instruction that designates C1 for selecting a plurality of candidate rows that need to be sorted, i.e., rows 1, 5, 7, 9, 11, 15, 17, 19. This instruction also designates C2 for sorting the candidate rows.

Figure 3:
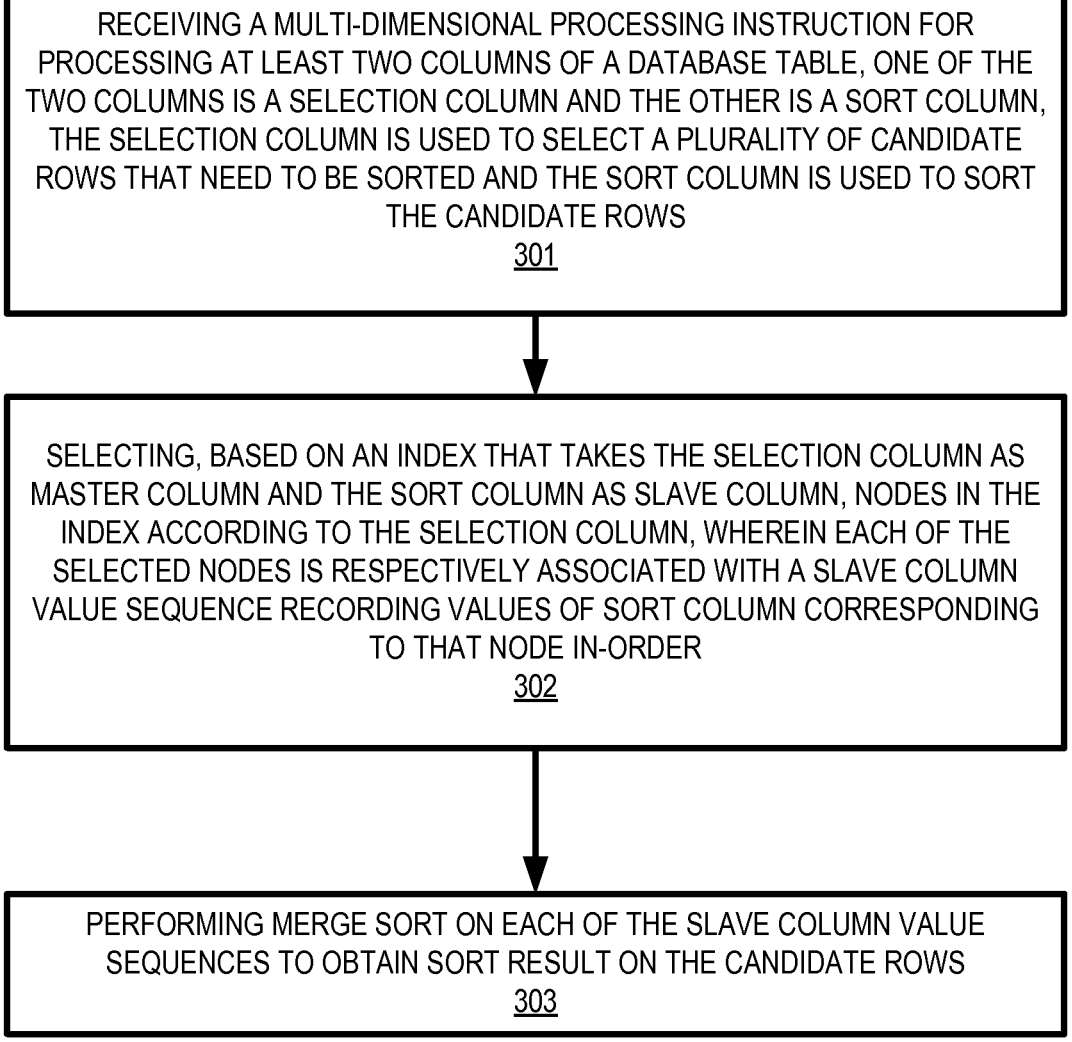
FIG. 3 is a flowchart of a method of processing a database table according to an embodiment of the invention.

A table in an actual database usually has a large number of rows. Consequently, many of the rows may be fetched based on matching values in a first column of the table. Sorting those many rows by values in a second column may consume a lot of system resources. Referring now to FIG. 3, a method for processing a database table is disclosed that can improve efficiency, according to embodiments of the present invention.

In step 301, a multi-dimensional processing instruction is received by a computer system for directing the system to process at least two columns of a database table.

Step 302 shows that the method includes selecting, based on an index that takes the selection column as master column and the sort column as slave column, nodes in the index according to the selection column. That is, as described in the following paragraph and the description of FIG. 4 that follows, each value that occurs one or more times in the selection column is taken as a node. If a value occurs in two rows of the selection column, for example, that selection column value belongs to the node, as do the one or more slave column values of those rows. Accordingly, each of the nodes is associated with a respective slave column value sequence, wherein the slave column value sequence for each node includes values (i.e., one or more values) of the sort column corresponding to that node. According to embodiments of the present invention, the slave column value sequence is set out in a particular order, for example, descending order.

A SQL statement Index IX(C1, C2) may be used to create an index in which C1 is for a master column and C2 is for a slave column, and the name of that index is IX. Those skilled in the art can appreciate that a purpose of creating an index is to perform retrieving in a better way. Thus, such an index may be created independently of whether a multi-dimensional processing instruction is to be executed. During the process of creating an index, a binary sort tree is created for the master column, wherein each value of the master column is taken as a node in the binary sort tree. The one or more values of the slave column that correspond to each node are recorded in association with the node. The one or more values of the slave column in each node are sorted, thereby forming a slave column value sequence for the node.

Figure 4:
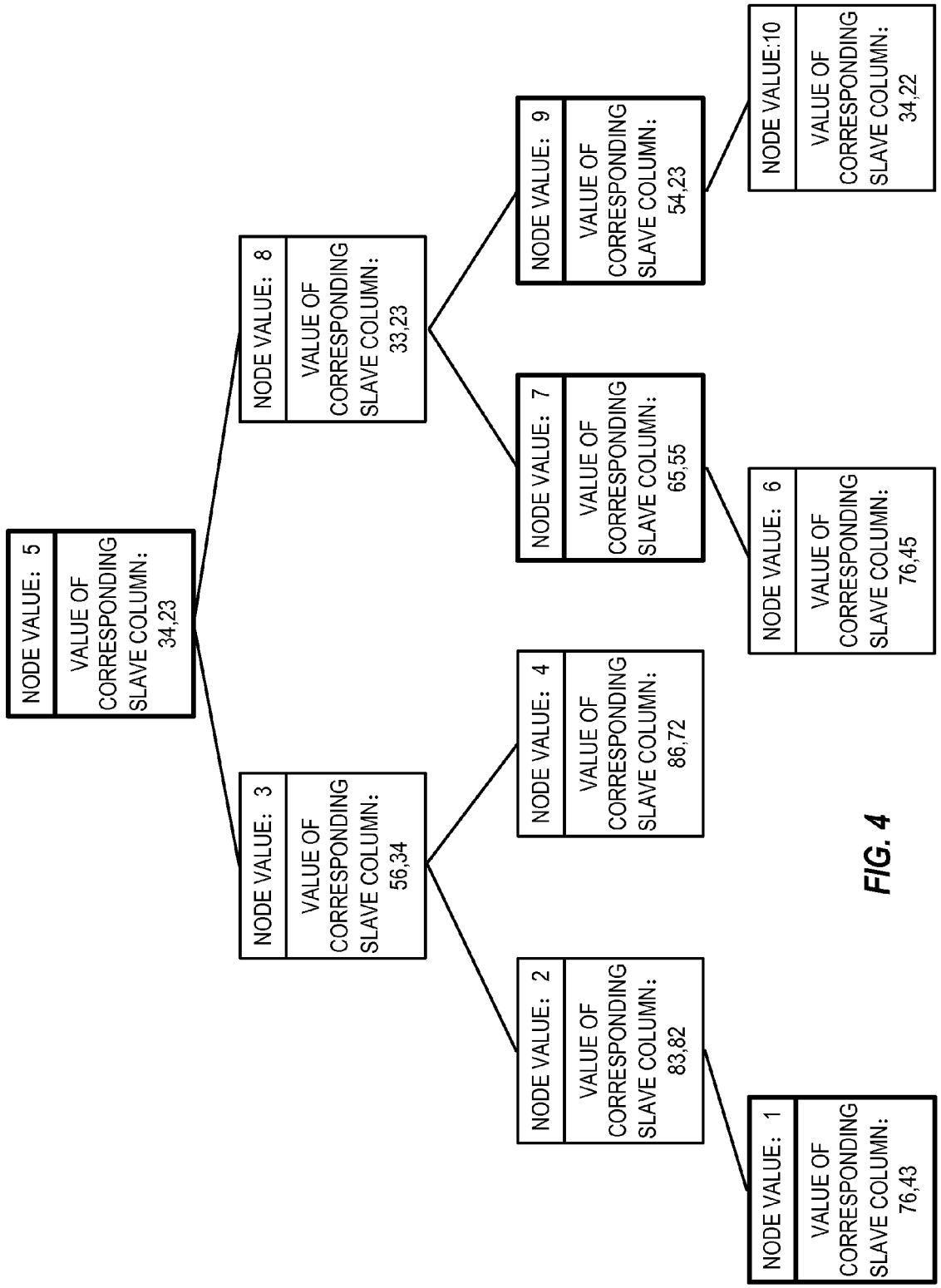
FIG. 4 depicts a diagram of indices of a database table.

FIG. 4 depicts a diagram of an index created for the database table shown in FIG. 2, in which C1 is for a master column and C2 is for a slave column. Those skilled in the art can appreciate that, depending on the employed algorithm, the actual form of a binary sort tree may be different from that shown in FIG. 4. However, this will not affect the description on embodiments of the invention. In the index shown in FIG. 4, each value of C1 corresponds to a node in the binary sort tree; and each corresponding value of C2 is also recorded at each node. For each node, its recorded value of C2 has been sorted. For example, it can be seen from FIG. 2 that, values of C1 for the $1^{st}$ and $11^{th}$ rows are both 1, which is deemed a node in the binary sort tree for C1. Further, it can be seen that the value of C2 corresponding to the $1^{st}$ row is 43 and the value of C2 corresponding to the $11^{th}$ row is 76. Sorting these values of C2 in descending order for the node, as shown in FIG. 4, the slave column value sequence is 76, 43 for the node, whose node value is 1.

Taking SQL statements shown in code 1 for example, by selecting nodes from the index based on the selection column, nodes whose node values are 1, 5, 7, 9, for example, can be acquired, that is, 4 grey nodes in FIG. 4. These 4 nodes are associated with values of two sort columns respectively. For each grey node, values of these two sort columns are recorded in-order, thus values of these two sort columns form a slave column value sequence. For example, the slave column value sequence for nodes whose node value is 1 is 76 and 43; the slave column value sequence for nodes whose node value is 5 is 34 and 23; the slave column value sequence for nodes whose node value is 7 is 65 and 55; and the slave column value sequence for nodes whose node value is 9 is 54 and 23.

Step 303 shows that the method includes performing merge sort on each of the slave column value sequences to obtain sort result on the candidate rows.

Those skilled in the art can appreciate that, if a data set has been divided into several subsets and all elements in these subsets are ordered, then time overhead required to perform merge sort on these subsets is log N, which is necessarily lower than time overhead N log N required to perform direct sort on elements in that data set. Here, N is number of elements in the data set.

In embodiments of the invention, during the process of creating an index, multiple subsets have been obtained, i.e., the slave column value sequences. Thus, time overhead required to perform merge sort on these slave column value sequences is log N, which is necessarily lower than time overhead N log N required to perform direct sort on slave column values of the candidate rows, wherein N is number of candidate rows. Thus, this avoids the need to perform direct sort on slave column values of all candidate rows under any circumstances, thereby improving efficiency in multi-dimensional processing.

In particular, SQL statements shown in code 1 are directed at sorting merely to acquire four candidate rows having the largest values of C2, so there is no need to sort other candidate rows. In this case, time overhead can be saved with the merge sort method of embodiments of the present invention, which is illustrated as shown in FIGS. 5A-5D.

Figure 5A:
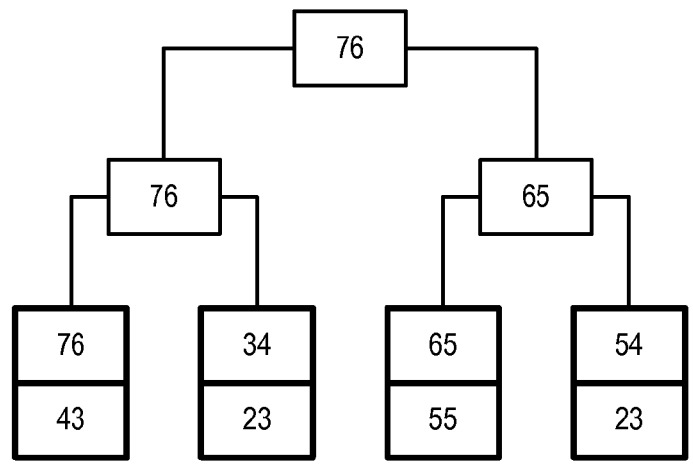
FIGS. 5A-5D depict statement execution procedures according to embodiments of the invention.
Figure 5B:
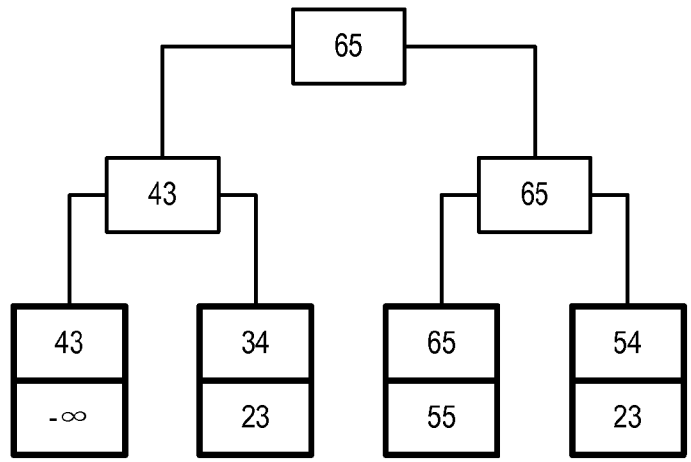
Figure 5C:
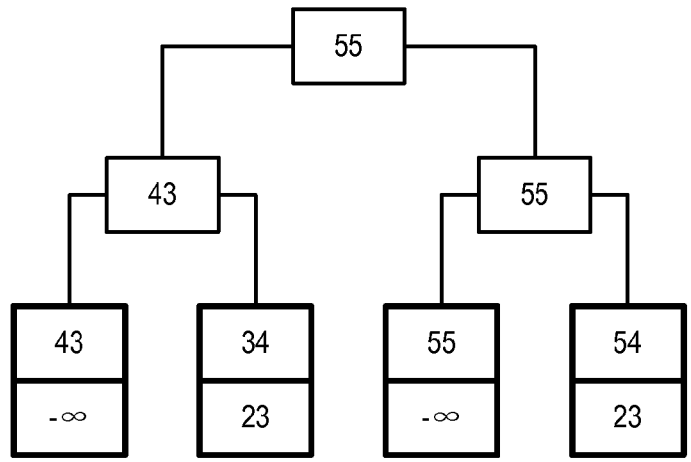
Figure 5D:
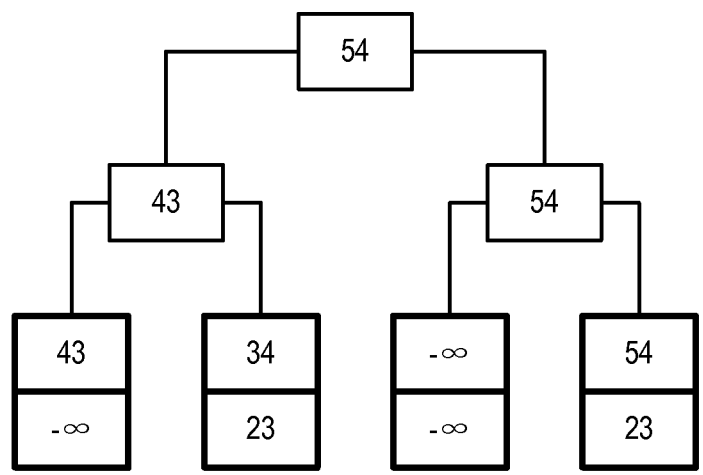

In FIGS. 5A-5D, grey sequences represent 4 slave column value sequences, which respectively correspond to nodes whose node values are 1, 5, 7, 9 in FIG. 4. In FIG. 5A, a largest value, i.e., 76, is selected from largest values in each of 4 slave column value sequences. In FIG. 5B, since 76 has been selected, 43 is the next value in the slave column value sequence where 76 occurs, so that 43 becomes a new largest value in that slave column value sequence. Again, a largest value, i.e., 65, is selected from remaining values in each of four slave column value sequences. In FIG. 5C, since 65 has been selected, 55 is the next value in the slave column value sequence where 65 occurs, so that 55 becomes a new largest value in that particular slave column value sequence. Again, a largest value, i.e., 55, is selected from remaining values in each of four slave column value sequences. In FIG. 5D, since 55 has been selected, a next value in the slave column value sequence where 55 occurs should become a new largest value in that slave column value sequence. However, since there is no other value in that slave column value sequence, it can be considered that a new largest value in that slave column value sequence is negative infinity (−∞). At this point in the process, a largest value is again selected from largest values in each of four slave column value sequences, which now is 54. Since four rows having largest C2 values in candidate rows have thus been acquired, there is no need to do any subsequent sorting calculation, thereby saving time overhead.

The implementation of step 303, according to an embodiment of the invention, is described herein below.

According to an embodiment of the invention, the merge sort in step 303 is performed as long as there is an index that takes the selection column as master column and the sort column as slave column.

Although merge sort reduces time overhead in sorting due to taking advantage of orderliness in slave column value sequences, it is not always superior to perform direct sorting on C2 values of all candidate rows. This is because, in case of merge sort, slave column value sequences need to be saved, such as by using work files. Creating and destroying of work files and other management conducted by system on these work files needs additional system time and space overheads. The larger the number of slave column value sequences, the larger the additional system overhead required in managing work files. Whereas in case of direct sort, only one work file is needed to record C2 values of all candidate rows, thereby saving system overhead due to managing work files. Therefore, when number of slave column value sequences is large, time overhead saved by merge sort can not offset additional system overhead due to managing work files, thereby leading to degradation in overall system performance.

Figure 6:
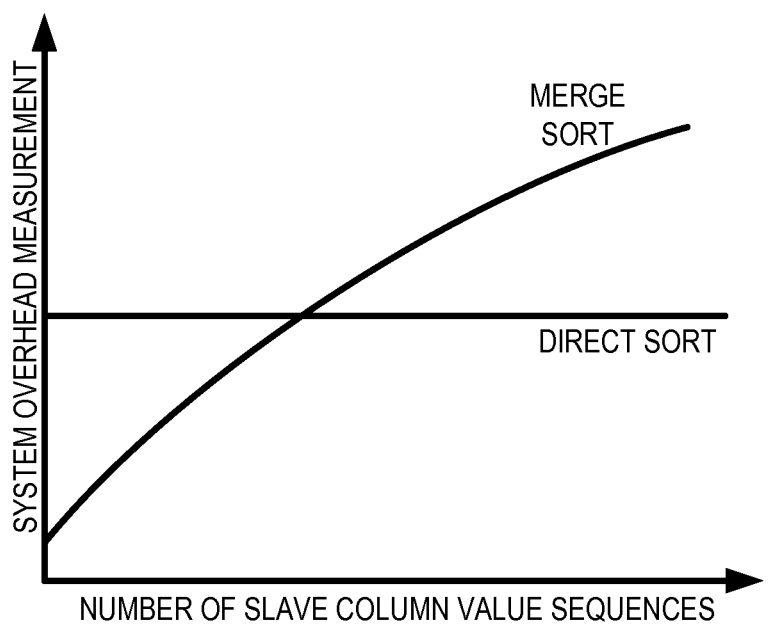
FIG. 6 depicts system overhead measurement of sort operation.

Depending on software and hardware configuration of each system, how large the number of slave column value sequences is will cause increase in system overhead and degradation in overall performance can only be determined after conducting a test on the system. FIG. 6 depicts a typical situation in which system overhead measurement varies with slave column value sequences. The system overhead measurement represents an integration of system overhead required to conduct sorting and system overhead required to manage work files. Generally, system overhead is mainly embodied in utilization of CPU and memory. Those skilled in the art can formulate different calculation methods to transform usage condition of CPU and usage condition of memory into the system overhead measurement. For ease of comparison, FIG. 6 also depicts system overhead measurement for direct sort. Those skilled in the art can appreciate that, there is no overhead for managing a plurality of work files in direct sort. Thus, system overhead measurement of direct sort only depends on system overhead required to conduct sort, thus is shown as a constant in FIG. 6.

As shown in FIG. 6, when number of slave column value sequences is small, system overhead measurement of merge sort is better than that of direct sort. Typically, if there is only one slave column value sequence, sorting of that slave column value sequence can be directly taken as sorting of all candidate rows. In this case, system overhead for sorting and that for managing work files are both very small. As number of slave column value sequences increases, due to system overhead required to manage work files becomes larger, system overhead measurement of merge sort will gradually become larger. When number of slave column value sequences becomes larger than a merge threshold, system overhead measurement of merge sort will be larger than system overhead measurement of direct sort.

Figure 7:
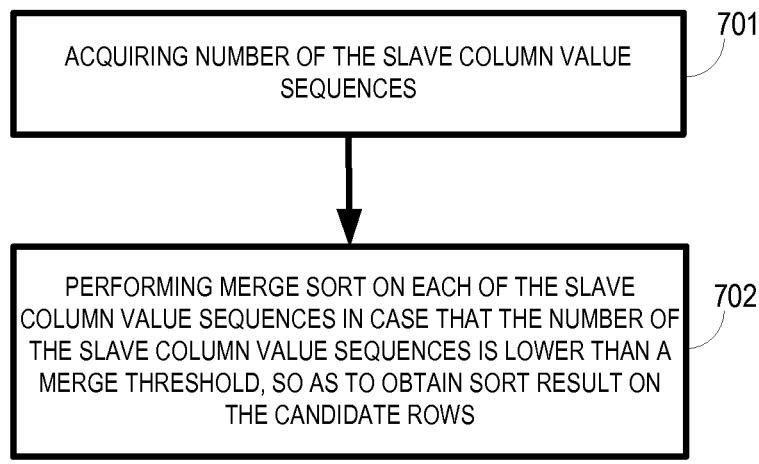
FIG. 7 is a flowchart of a method of processing a database table according to an embodiment of the invention.

Accordingly, according to another embodiment of the invention, implementation of step 303 is as shown in FIG. 7.

As step 701 shows, the method includes acquiring the number of the slave column value sequences.

In some cases, an exact number of the slave column value sequences may be acquired from SQL statements themselves. Taking the SQL statements in code 1 for example, the number of slave column value sequences thereof is 4.

In some cases, the approximate number of the slave column value sequences may be estimated from SQL statements themselves. For example, consider the following SQL statements:

```
                        code 2
        SELECT C2
        FROM T1
        WHERE C1 BETWEEN 100 AND 200
        ORDER BY C2
        FETCH FIRST 4 ROWS ONLY
```

The above statements select from T1 those rows whose values of C1 are between 100 and 200 as candidate rows; then, perform sorting on these candidate rows according to values of C2 in these candidate rows; and finally fetch the first 4 rows. Thus, in a case where the value of C1 can only be an integer, the number of the slave column value sequences is 100 at most.

In some cases, the number of the slave column value sequences can not be estimated from SQL statements themselves at all. For example, consider the following SQL statements:

```
                        code 3
        SELECT C2
        FROM T1
        WHERE C1 > 100
        ORDER BY C2
        FETCH FIRST 4 ROWS ONLY
```

The above statements select from T1 those rows whose values of C1 are greater than 100 as candidate rows; then perform sorting on these candidate rows according to values of C2 in these candidate rows; and finally fetch the first 4 rows. Since the largest value of values of C1 can not be determined, there may be any number of slave column value sequences. In this case, the number of the slave column value sequences may be marked as infinitely great.

Step 702 illustrates performing merge sort on each of the slave column value sequences in a case where the number of the slave column value sequences is lower than a merge threshold, so as to obtain sort result on the candidate rows.

As shown in FIG. 6, when the number of the slave column value sequences is larger than the merge threshold, system overhead measurement of merge sort will instead be larger than that of direct sort. Thus, merge sort will be used only when the number of the slave column value sequences is lower than a merge threshold.

If the number of the slave column value sequences can be determined at code parsing stage, then the number of the slave column value sequences and the merge threshold can be directly compared in step 702. In some cases, although the exact number of the slave column value sequences cannot be determined, the range of the number can be determined. For example, for SQL statements shown in code 2, the range of the number is 1 to 100. If the largest value in the range is also smaller than the merge threshold (e.g., the merge threshold is 500), then the actual number of the slave column value sequences will necessarily be lower than the merge threshold. Accordingly, the merge sort may also be performed.

In other cases, it can not be judged at code parsing stage whether the number of the slave column value sequences is lower than the merge threshold. For example, the largest value of the determined range of the number of slave column value sequences is larger than the merge threshold. In SQL statements shown in code 2, if the merge threshold is 50, it can not be determined whether the actual number of the slave column value sequences is lower than the merge threshold. In some cases, even the range of number of the slave column value sequences can not be determined, such as the SQL statements shown in code 3.

The number of the slave column value sequences can be acquired via a runtime feedback mechanism. According to an embodiment of the invention, the number of the slave column value sequences can be acquired by traversing the index. For example, if there is an index that takes the selection column as master column and the sort column as slave column, then there is a binary sort tree for all values of selection column C1. In the binary sort tree, each value of C1 is taken as each node of the binary sort tree. Those skilled in the art will appreciate that, nature of a binary sort tree is as follows: taking any node as root node, if left child tree is not null, node values of all nodes on the left child tree are all smaller than node value of that root node; if right child tree is not null, node values of all nodes on the right child tree are all larger than node value of that root node; in addition, each of the left and right child trees is also a binary sort tree. By utilizing this nature, number of the slave column value sequences can be determined by traversing that binary sort tree. How to find a node whose value meets a certain criteria through binary sort tree belongs to common knowledge in the art. The number of the slave column value sequences can be naturally determined upon finding these nodes, because slave column value sequence and node are in one-to-one correspondence.

Those skilled in the art can also devise other solutions to obtain the number of the slave column value sequences. For example, by collecting statistics on C1 values corresponding to all candidate rows, it can be obtained how many C1 values correspond to all these candidate rows. Since C1 value and slave column value sequence are in one-to-one correspondence, the number of C1 values will be equal to that of the slave column value sequences.

Figure 8:
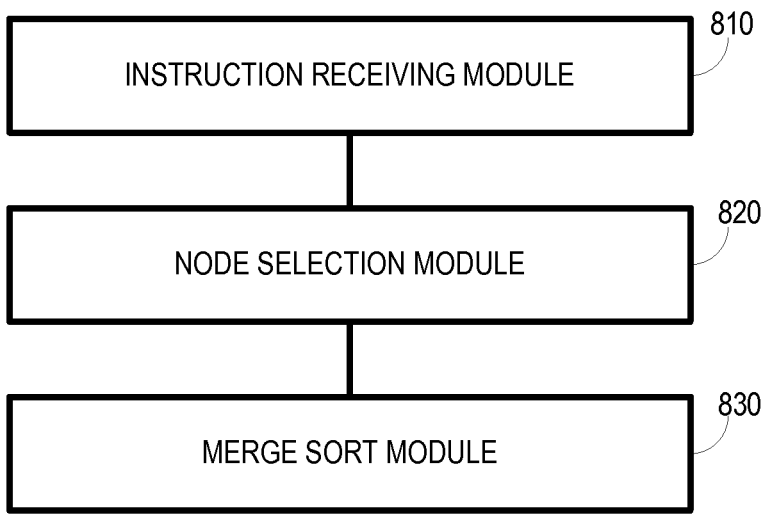
FIG. 8 is a block diagram of an apparatus of processing a database table according to an embodiment of the invention.

FIG. 8 is a block diagram of an apparatus 800 of processing a database table according to an embodiment of the invention.

The apparatus according 800 to an embodiment of the invention can typically be realized by a computer program running on the illustrative computer system shown in FIG. 1. Although FIG. 1 depicts hardware structure of a general purpose computer system, due to this computer system running the computer program and realizing the solution according to embodiments of the invention, this computer system/server is transformed from a general purpose computer system/server into an apparatus according to embodiments of the invention.

Further, although the apparatus 800 according to embodiments of the invention as a whole is realized by a same general-purpose computer system, respective means or modules constituting this apparatus are essentially realized by separate hardware. This is because, when running the computer program, the general-purpose computer system often employs a shared manner such as time division or processor core division to realize the respective means or modules. Taking time division for example, at a particular point in time, the general-purpose computer system is used as hardware dedicated to realize specific means or module; at different points in time, the general-purpose computer system is used as different hardware dedicated to realize different means or modules. Thus, the apparatus according to embodiments of the invention is a combination of a series of means or modules implemented in hardware manner, rather than merely being functional module architecture. On the contrary, the apparatus according to embodiments of the invention may also be considered as a physical apparatus that realizes the solution of embodiments of the invention mainly through hardware manner.

The apparatus 800 of processing a database table according to an embodiment of the invention comprises:

an instruction receiving module 810 configured to receive a multi-dimensional processing instruction for processing at least two columns of the database table, wherein one of the two columns is a selection column and the other is a sort column, the multi-dimensional processing instruction selects a plurality of candidate rows that need to be sorted based on the selection column and sorts the candidate rows based on the sort column;

a node selection module 820 configured to select, if there is an index that takes the selection column as master column and the sort column as slave column, nodes in the index according to the selection column, wherein each of the selected nodes is respectively associated with a slave column value sequence recording values of sort column corresponding to that node in-order; and a merge sort module 830 configured to perform merge sort on each of the slave column value sequences to obtain sort result on the candidate rows.

Wherein the merge sort module 830 comprises:

a module configured to acquire the number of the slave column value sequences;

a module configured to perform merge sort on each of the slave column value sequences in case that the number of the slave column value sequences is lower than a merge threshold.

Wherein the module configured to acquire the number of the slave column value sequences comprises:

a module configured to acquire the number of the slave column value sequences at a stage in which code parsing is performed on the multi-dimensional processing instruction.

Wherein the module configured to acquire the number of the slave column value sequences comprises:

a module configured to acquire the number of the slave column value sequences via a runtime feedback mechanism.

Wherein the module configured to acquire the number of the slave column value sequences via a runtime feedback mechanism:

a module configured to acquire the number of the slave column value sequences by traversing the index.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of processing a database table, the method comprising:

receiving a multi-dimensional processing instruction for processing at least two columns of the database table, wherein one of the two columns is a selection column and the other is a sort column, wherein the multi-dimensional processing instruction is for selecting candidate rows of the table based on the selection column and sorting the selected candidate rows based on the sort column, each row of the table having a value in the selection column and a value in the sort column;

selecting candidate rows of the table responsive to the candidate rows being indicated for selection by the multi-dimensional processing instruction, where the selecting is performed using an index having a single node for each value that occurs in the selection column, so that even when a value occurs in more than one row of the selection column, the index has as many nodes as there are rows in the table having unique values in the selection column, where each node of the index includes each sort column value for each respective row in the table having the node's selection column value, so that each node of the index has as many sort column values as there are rows in the table having the node's selection column value, where the nodes of the index are configured such that when a node has more than one sort column value, the sort column values in the node are set are in a predetermined sort column value sequence; and sorting the selected candidate rows according to their sort column values by using the sort column values of the nodes of the index corresponding to the selected candidate rows that were selected responsive to the multi-dimensional processing instruction, where the nodes that correspond to the selected candidate rows are used, including the sort column values of the nodes that correspond to the selected candidate rows, to perform merge sort for obtaining a sort result of the selected candidate rows without performing a sort directly on the sort column values directly from the table, wherein sorting the selected candidate rows comprises:

acquiring the number of sort column value sequences for the selected candidate rows; and performing the merge sort on each of the sort column value sequences when the number of the sort column value sequences is lower than a merge threshold.

2. The method according to claim 1, wherein acquiring the number of the sort column value sequences comprises:

acquiring the number of the sort column value sequences at a stage in which code parsing is performed for the multi-dimensional processing instruction.

3. The method according to claim 1, wherein acquiring the number of the sort column value sequences comprises:
acquiring the number of the sort column value sequences via a runtime feedback mechanism.

4. The method according to claim 3, wherein acquiring the number of the sort column value sequences via a runtime feedback mechanism comprises:
acquiring the number of the sort column value sequences by traversing the index.

5. A system of processing a database table, comprising:
a processor; and
computer readable storage media having instructions stored thereon for execution by the processor, wherein the instructions executed by the processor cause the processor to perform operations comprising:
receiving a multi-dimensional processing instruction for processing at least two columns of the database table, wherein the two columns comprise a selection column and a sort column, wherein the multi-dimensional processing instruction is for selecting candidate rows based on the selection column and sorting the selected candidate rows based on the sort column, each row of the table having a value in the selection column and a value in the sort column;
selecting candidate rows of the table responsive to the candidate rows being indicated for selection by the multi-dimensional processing instruction, where the selecting is performed using an index having a single node for each value that occurs in the selection column, so that even when a value occurs in more than one row of the selection column, the index has as many nodes as there are rows in the table having unique values in the selection column, where each node of the index includes each sort column value for each respective row in the table having the node's selection column value, so that each node of the index has as many sort column values as there are rows in the table having the node's selection column value, where the nodes of the index are configured such that when a node has more than one sort column value, the sort column values in the node are set out in a predetermined sort column value sequence; and
sorting the selected candidate rows according to their sort column values by using the sort column values of the nodes of the index corresponding to the selected candidate rows that were selected responsive to the multi-dimensional processing instruction, where the nodes that correspond to the selected candidate rows are used, including the sort column values of the nodes that correspond to the selected candidate rows, to perform merge sort for obtaining a sort result of the selected candidate rows without performing a sort directly on the sort column values directly from the table,
wherein sorting the selected candidate rows comprises:
acquiring the number of sort column value sequences for the selected candidate rows; and
performing the merge sort on each of the sort column value sequences when the number of the sort column value sequences is lower than a merge threshold.

6. The system according to claim 5, wherein acquiring the number of the sort column value sequences comprises:
acquiring the number of the sort column value sequences at a stage in which code parsing is performed for the multi-dimensional processing instruction.

7. The system according to claim 5, wherein acquiring the number of the sort column value sequences comprises:
acquiring the number of the sort column value sequences via a runtime feedback mechanism.

8. The system according to claim 7, wherein acquiring the number of the sort column value sequences via a runtime feedback mechanism comprises:
acquiring the number of the sort column value sequences by traversing the index.

9. A computer program product for processing a database table, the computer program product comprising a non-transitory computer readable storage medium having program instructions embodied therewith, the program instructions executable by a computer to cause the computer to perform operations comprising:
receiving a multi-dimensional processing instruction for processing at least two columns of the database table, wherein the two columns comprise a selection column and a sort column, wherein the multi-dimensional processing instruction is for selecting candidate rows of the table based on the selection column and sorting the selected candidate rows based on the sort column, each row of the table having a value in the selection column and a value in the sort column;
selecting candidate rows of the table responsive to the candidate rows being indicated for selection by the multi-dimensional processing instruction, where the selecting is performed using an index having a single node for each value that occurs in the selection column, so that even when a value occurs in more than one row of the selection column, the index has as many nodes as there are rows in the table having unique values in the selection column, where each node of the index includes each sort column value for each respective row in the table having the node's selection column value, so that each node of the index has as many sort column values as there are rows in the table having the node's selection column value, where the nodes of the index are configured such that when a node has more than one sort column value, the sort column values in the node are set out in a predetermined sort column value sequence; and
sorting the selected candidate rows according to their sort column values by using the sort column values of the nodes of the index corresponding to the selected candidate rows that were selected responsive to the multi-dimensional processing instruction, where the nodes that correspond to the selected candidate rows are used, including the sort column values of the nodes that correspond to the selected candidate rows, to perform merge sort for obtaining a sort result of the selected candidate rows without performing a sort directly on the sort column values directly from the table,
wherein sorting the selected candidate rows comprises:
acquiring the number of sort column value sequences for the selected candidate rows; and
performing the merge sort on each of the sort column value sequences when the number of the sort column value sequences is lower than a merge threshold.

10. The computer program product of claim 9, wherein acquiring the number of the sort column value sequences comprises:
acquiring the number of the sort column value sequences at a stage in which code parsing is performed for the multi-dimensional processing instruction.

11. The computer program product of claim 9, wherein acquiring the number of the sort column value sequences comprises:
  acquiring the number of the sort column value sequences via a runtime feedback mechanism.

12. The computer program product of claim 11, wherein acquiring the number of the sort column value sequences via a runtime feedback mechanism comprises:
  acquiring the number of the sort column value sequences by traversing the index.

* * * * *